United States Patent [19]

Short, II

[11] Patent Number: 5,203,451
[45] Date of Patent: Apr. 20, 1993

[54] STATIONARY HOLDER FOR WORK-SITE ENVIRONMENT

[76] Inventor: Don L. Short, II, 706 Leawood Dr., Omaha, Nebr. 68154

[21] Appl. No.: 836,098

[22] Filed: Feb. 14, 1992

[51] Int. Cl.$^5$ ............................................. A45C 11/34
[52] U.S. Cl. .................... 206/214; 206/813; 211/69.1
[58] Field of Search .................... 206/214, 813, 215; 211/69.1, 69.2, 69.3, 69.4, 69.5

[56] References Cited

U.S. PATENT DOCUMENTS

| 665,057 | 1/1901 | Brower | 206/214 |
|---|---|---|---|
| 788,060 | 4/1905 | Otto | 206/214 X |
| 2,202,300 | 5/1940 | Poshack | 211/69.1 |
| 2,805,870 | 9/1957 | Aimes | 211/69.5 |
| 3,410,513 | 11/1968 | Wolf | 211/69.1 |
| 4,645,077 | 2/1987 | McLaughlin et al. | 206/215 X |
| 4,875,591 | 10/1989 | Mikesell | 211/69.1 |

FOREIGN PATENT DOCUMENTS 1501989  10/1967  France ............................ 206/214

Primary Examiner—William I. Price
Attorney, Agent, or Firm—Pravel, Hewitt, Kimball & Krieger

[57] ABSTRACT

Disclosed are stationery holders for adhesive attachment uprightly alongside a selectable work-site environment and which stationery holder includes the capabilities for removably accommodating writing instrument type stationery items along downwardly-convergent tubular members and writing material type stationery items within one or more box-like compartments located forwardly of the downwardly-convergently tapered upright tubular members.

2 Claims, 1 Drawing Sheet

U.S. Patent | Apr. 20, 1993 | 5,203,451
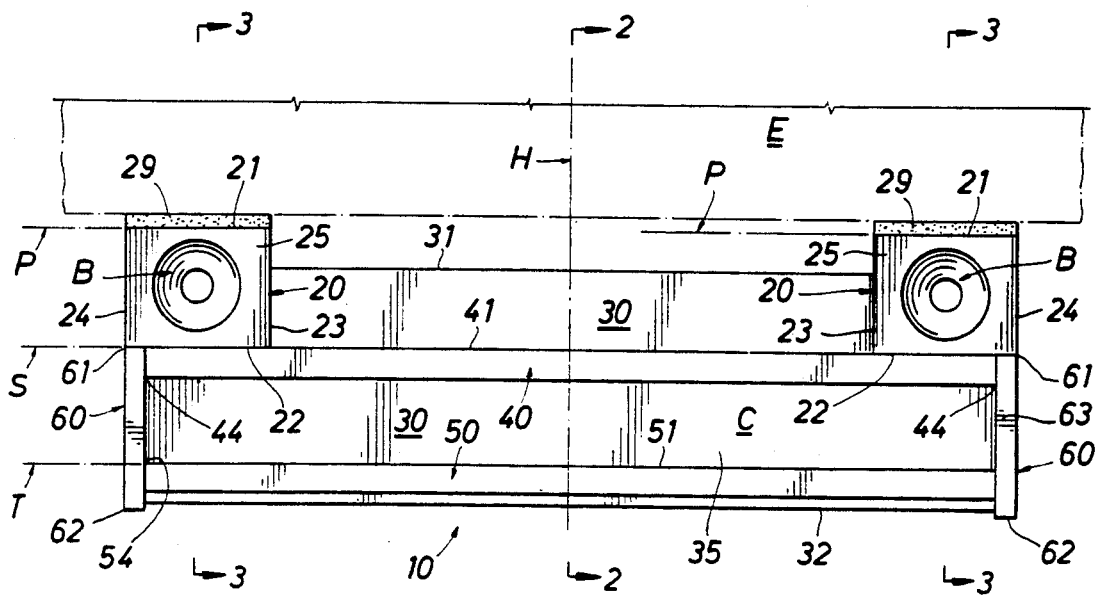
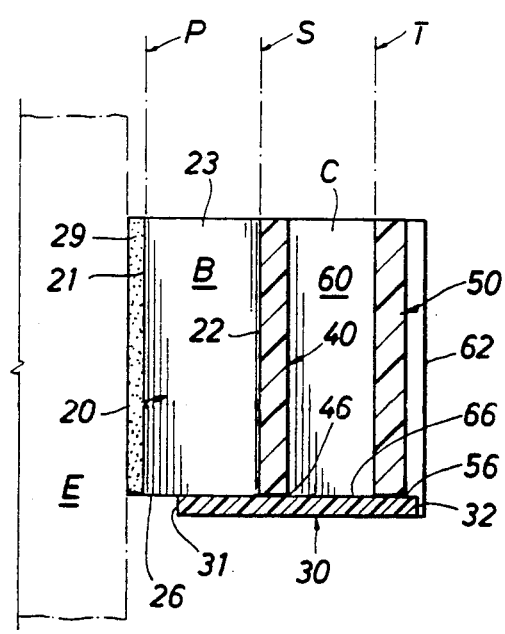
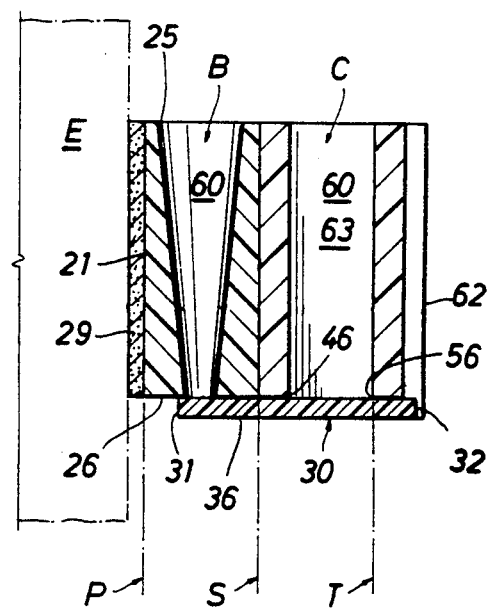

STATIONARY HOLDER FOR WORK-SITE ENVIRONMENT

OBJECTIVE OF THE INVENTION

It is the general objective of the present invention to provide a stationery holder device for removably accommodating therewithin writing instrument and inscribable writing material stationery items, and which stationery holder device is uprightly adhesively attachable uprightly alongside selectable office work-site environments such as telephone, computer console, facsimile-transmission devices, or the like.

GENERAL STATEMENT OF THE INVENTION

With the above general objective in view, and together with other ancillary and related objectives which will become more apparent as this ensuing description proceeds, the stationery holder device concept of the present invention uprightly extends along and is adhesively attachable to an uprightly extendable work site environment and among such stationery is adapted to removably accommodate writing instrument type stationery within one or more tubular members and inscribable writing material within a box-like compartment located directionally forwardly of the said tubular member(s).

BRIEF DESCRIPTION OF THE DRAWING

In the drawing, wherein like characters refer to like parts in the several views, and in which:

FIG. 1 is a top plan view of a representative embodiment (10) of the stationery holder of the present invention;

FIG. 2 is a sectional elevational view taken along line 2—2 of FIG. 1; and

FIG. 3 is a sectional elevational view taken along lines 3—3 of FIG. 1.

DETAILED DESCRIPTION OF THE DRAWING

In accordance with the general objectives alluded to hereabove, the stationery holder of the present invention uprightly extends along and is adhesively attached (e.g. 29) to an uprightly extending selectable work site environment ("E") and among such stationery is adapted to removably accommodate (at "B") writing instrument type stationery and to also removably accommodate (at "C") writing material type stationery.

A representative embodiment stationery holder, fulfilling the said general objectives, is the stationery holder representative embodiment 10 described in drawing FIGS. 1-3. Representative embodiment 10, which extends along a horizontal and directionally longitudinal central-axis "H", comprises: a pair of upright tubular members directionally laterally flanking central-axis "H", which tubular members 20 carry said environmental-attachment adhesive 29, and being provided with a downwardly tapered bore "B" for holding a pencil or other writing instrument; a horizontal floor-panel 30 for each tubular member (20) and extending forwardly therefrom to underly a compartment "C" for holding a writing material type stationery; and said compartment ("C") being: rearwardly defined by an upright rear-panel 40 intersecting central-axis "H", forwardly defined by an upright front-panel 50 intersecting central-axis "H", floor-panel 30, and upwardly extending opposed endwalls 60 flanking central-axis "H".

Herein depicted for representative embodiment 10, each upright tubular member 20, is rectangular in plan view from a horizontal top-end 25 to a horizontal bottom-end 26, and has four upright sides including: a rear-side 21, a front-side 22, an inner-side 23, and an outer-side 24. Upright rear-sides 21 of the two tubular members 20 lie along a common upright primary-plane "P" that perpendicular intersects central-axis "H". Analagously, upright front-sides 22 of tubular members 20 lie along a common upright secondary-plane "S" that perpendicularly intersects central-axis "H". Each tubular member (in downwardly-tapered central-bore form "B") is adapted to removably accommodate therewithin a pencil or equivalent writing instrument type stationery.

Herein also depicted for representative embodiment 10 is a horizontal floor-panel 30 having: a pair of horizontal opposed surfaces including an upper-surface 35 attached to the tubular members' bottom-ends 26 and also a lower-surface 36, a horizontally extending rear-end 31 that perpendicularly intersects central-axis "H", an horizontally extending front-end 32 that perpendicularly intersects central-axis "H", and two parallel horizontal outer-ends that parallel flank central-axis "H".

Also depicted for representative embodiment 10 is a pair of parallel upright endwalls 60 that respectively parallel flank said central-axis "H", each endwall 60 having: a horizontal base-end 66 attached to floor-panel upper-surface 35, an upright inside-surface 63 an upright trail-surface 61 attached to a tubular member front-side 22, and an upright lead-surface 62.

Also depicted for representative embodiment 10 is an upright rear-panel 40 that perpendicularly intersects central-axis "H" and includes: an upright rear-surface 41 extending along secondary-plane "S" and attached to the upright front-sides 22 of tubular members 20, a horizontal basic-end 46 that is attached to floor-panel upper-surface 35, and upright terminal-ends 44 attached to end-walls' inside-surfaces 63, adjacent endwalls' trail-surfaces 61.

Also depicted for representative embodiment 10 is another upright panel (i.e. front-panel 50) that perpendicularly intersects central-axis "H" and includes: an upright back-surface 51 extending along upright tertiary-plane "T", having a horizontal basal-end 56 that is attached to floor-panel upper-surface 35, and upright marginal-ends 54 attached to end-walls' inside-surfaces 63, adjacent end-walls' lead-surfaces 62.

Thus, between upright rear-panel 40 and upright front-panel 50, and extending upwardly from floor-panel 30, there is defined a compartment "C" adapted to removably accommodate therewithin a writing material type stationery item. Further compartments, including sub-divided compartments, might be analagously provided along-side compartment "C".

Upright rear-sides 21 of tubular members 20 (along said primary-plane "P") are provided therealong with an adhesive-material layer 29 whereby the stationery holder device (e.g. 10) might be securely attached to a telephone, a computer apparatus, or other selectable office work-site environment "E". Prior to installation, the holder adhesive (29) might be in a laminar releasably protectable form.

From the foregoing, the construction and operation of the stationery holder device concepts of the present invention will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A stationary holder for compact, upright storage of a writing instrument and a pad of writing material, comprising:

a substantially upright compartment which is open at the top and includes a front, back, bottom, a first side and a second side, said upright compartment adapted to vertically receive a pad of writing material;

a first upright member attached to said upright compartment, said first upright member having a substantially vertical tubular opening adapted to vertically receive a first writing instrument;

means for attaching the stationery holder to a vertical surface; and a second upright member attached to said upright compartment, said second upright member having a substantially vertical tubular opening adapted to vertically receive a second writing instrument, wherein said first and second upright members are attached to said back of said compartment substantially adjacent to said first and second side respectively and said first and second upright members include a rear vertical surface and said attaching means includes an adhesive layer on said rear vertical surface permitting the stationery holder to be securely attached and supported to a vertical surface.

2. A stationery holder for compact, upright storage of writing instruments and a pad of writing material, comprising:

a substantially upright box-like compartment which is open at the top and includes a front, a back, a bottom, a first side and a second side, said upright box-like compartment adapted to receive and vertically store a pad of writing material;

a first upright member attached to said upright box-like compartment, said first upright member having a substantially vertical tubular opening adapted to vertically receive and store a first writing instrument;

a second upright member attached to said upright box-like compartment, said second upright member having a substantially vertical tubular opening adapted to vertically receive and store a second writing instrument; and means for mounting said first and second upright members to a vertical surface;

wherein said first and second upright members are attached to said back of said box-like compartment substantially adjacent to said first and second sides respectively, said first and second upright members each include a rear vertical surface, and said mounting means includes an adhesive layer permitting the stationery holder to be securely attached and supported to a vertical surface.

* * * * *